H. V. CONRAD.
EYEGLASS CASE.
APPLICATION FILED OCT. 10, 1911.
1,025,372.
Patented May 7, 1912.
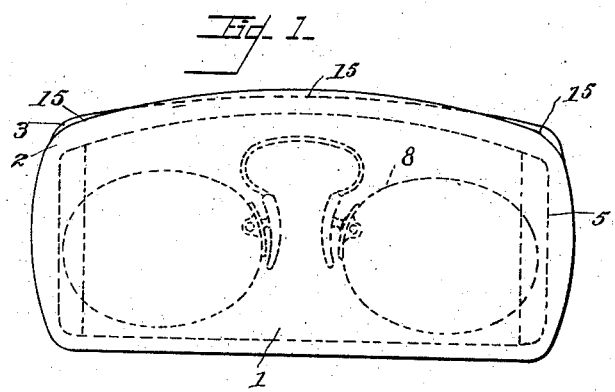
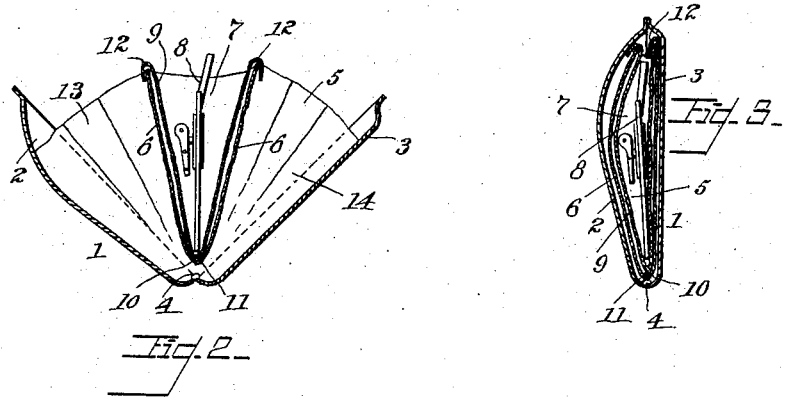
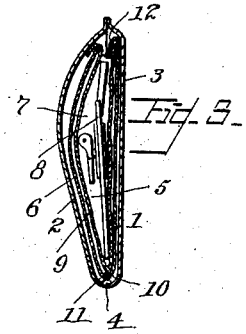
WITNESSES:
INVENTOR.
Hugh V. Conrad
BY
his ATTORNEY.

UNITED STATES PATENT OFFICE.

HUGH V. CONRAD, OF PITTSBURGH, PENNSYLVANIA.

EYEGLASS-CASE.

1,025,372.  Specification of Letters Patent.  Patented May 7, 1912.

Application filed October 10, 1911. Serial No. 653,909.

*To all whom it may concern:*

Be it known that I, HUGH V. CONRAD, a citizen of the United States, and resident of Pittsburgh, in the county of Allegheny and State of Pennsylvania, have invented certain new and useful Improvements in Eyeglass-Cases, of which the following is a specification.

This invention relates to eyeglass cases, and the object of the invention is to provide a case for eyeglasses, which will facilitate the cleaning of the lenses when desired. Persons who wear glasses usually rub the lenses from time to time with a clean handkerchief, but a handkerchief used as a wiper generally leaves lint on the lenses and the handkerchief often picks up small particles from the inside of the pocket which adhere to the glasses.

A further object of the invention is to provide a construction whereby the wiper will be carried within the case, and arranged so that the glasses can be conveniently rubbed without removing them.
And also to enable the wiper to be replaced when desired.

In the drawing which fully illustrates my invention, Figure 1 is a side elevation of an eyeglass case constructed according to my invention. Fig. 2 is a transverse section through the eyeglass case showing it in its open position and fully illustrating its interior construction and the manner in which the lenses may be cleaned before removing the glasses from the case. Fig. 3 is a view similar to Fig. 2 but showing the eyeglass case closed.

Referring more particularly to the parts, 1 represents an eyeglass case of a common form, comprising two rigid sides or covers 2 and 3 which are connected at one edge by a spring hinge 4. In applying my invention to such an eyeglass case, I provide the interior of the case with aprons or end walls 5 connecting the covers 2 and 3, and which are formed of light leather, chamois or similar material; these aprons become extended when the eyeglass case is open and limit the outward or opening movement of the sides 2 and 3. The aprons 5 are connected by two longitudinal division walls or leaves 6 which form an acute angle with each other when the eyeglass case is opened as indicated in Fig. 2, and these division walls unite near the hinge connection 4 and form a V-shaped pocket 7, which receives the glasses 8, as indicated. I set a removable wiper or cleaner 9 in this pocket. This wiper is preferably in the form of a strip of suitable cloth, chamois or paper which forms a loose lining for two sides of the pocket, and has a folded edge 10 which is preferably secured at the junction point of the division walls 6, by a piece of adhesive material or gum 11. The upper edges 12 of the wiper are loose, and folded over the upper edge of the division walls as shown. The division walls are of very light leather, chamois, or similar flimsy material.

Between the pocket walls 6 and the sides 2 and 3, side pockets 13 and 14 are formed. When the eyeglass case is open, as indicated in Fig. 2, it may be held in the left hand and with the thumb and forefinger inserted in the side pockets 13 and 14 respectively the division walls 6 may be pressed inwardly against the lenses and rubbed around so as to rub the surfaces of the lenses with the cleaner or wiper 9. The division walls 6 must have practically no stiffness as that would prevent rubbing the lenses as described.

When the wiper becomes soiled or worn out from use, it can be readily removed by detaching it at the point 11 and then can be replaced by a new wiper. In this way the eyeglasses can be very conveniently cleaned when desired, and the cleaner or wiper held in a convenient position to be applied to the lenses. The end walls 5 prevent any possibility of the glasses falling out while wiping them. But the eyeglasses can be removed from the case with the same readiness as though the cleaning devices were absent.

When the wiper is too flimsy to be supported by the folded edges 12 it may be secured near these edges by an adhesive.

In Fig. 1 the outer edges of the members 2 and 3 of the case are represented as overlapping, at 15, and not registering perfectly. This is to facilitate the opening of the case.

What I claim and desire to secure by Letters Patent, is:

1. An eyeglass case comprising two members having a spring hinge connection and adapted to swing apart, and having an eyeglass pocket having closed ends and formed of flimsy material between the said members, and a wiper forming a lining in said pocket and disposed on opposite sides of the said pocket, permitting the wiping of the glasses while held by said pocket.

2. An eyeglass case comprising two members joined together to swing apart, members of flimsy material adapted to fold into the interior of said case forming an open pocket having closed ends and supporting said glasses when said case is open and forming side pockets at each side of said first pocket for receiving the thumb and finger to rub the said members against the lenses in wiping said glasses.

3. An eyeglass case having an inner pocket for the glasses provided with end walls and with flimsy side walls and a removable wiper in said pocket forming a lining therefor to lie adjacent the lenses.

4. An eyeglass case having an inner pocket therein adapted to receive the eyeglasses, said pocket having end walls to retain the glasses and having flimsy walls arranged to be rubbed against the lenses of the eyeglasses, while held in said inner pocket.

Signed at Milwaukee, in the county of Milwaukee and State of Wisconsin, this fifth day of October, A. D. 1911.

HUGH V. CONRAD.

Witnesses:
F. P. COOK,
W. K. BOYLE.

Copies of this patent may be obtained for five cents each, by addressing the "Commissioner of Patents, Washington, D. C."